(12) United States Patent
Dash et al.

(10) Patent No.: US 11,621,764 B2
(45) Date of Patent: Apr. 4, 2023

(54) MOBILE WIRELESS REPEATER

(71) Applicant: SEMICONDUCTOR COMPONENTS INDUSTRIES, LLC, Phoenix, AZ (US)

(72) Inventors: Debashis Dash, Newark, CA (US); Bahador Amiri, Saratoga, CA (US)

(73) Assignee: QUANTENNA COMMUNICATIONS, INC., Phoenix, AZ (US)

( * ) Notice: Subject to any disclaimer, the term of this patent is extended or adjusted under 35 U.S.C. 154(b) by 0 days.

(21) Appl. No.: 17/132,023

(22) Filed: Dec. 23, 2020

(65) Prior Publication Data
US 2021/0119691 A1    Apr. 22, 2021

Related U.S. Application Data

(63) Continuation of application No. 15/635,179, filed on Jun. 27, 2017, now Pat. No. 10,903,894.

(51) Int. Cl.
| | |
|---|---|
| *H04B 7/14* | (2006.01) |
| *H04W 88/08* | (2009.01) |
| *H04L 1/00* | (2006.01) |
| *H04L 5/00* | (2006.01) |
| *H04L 27/26* | (2006.01) |
| *H04W 84/12* | (2009.01) |

(52) U.S. Cl.
CPC ............ *H04B 7/14* (2013.01); *H04L 1/0003* (2013.01); *H04L 5/006* (2013.01); *H04L 27/2601* (2013.01); *H04W 84/12* (2013.01); *H04W 88/08* (2013.01)

(58) Field of Classification Search
None
See application file for complete search history.

(56) References Cited

U.S. PATENT DOCUMENTS

| | | |
|---|---|---|
| 8,649,747 B1 | 2/2014 | Emmanuel et al. |
| 9,594,372 B1 | 3/2017 | Sills et al. |
| 9,653,800 B2 | 5/2017 | Norin |
| 9,867,017 B1 | 1/2018 | Bacarella et al. |
| 10,021,521 B1* | 7/2018 | Reeves ............ H04W 36/0055 |
| 2004/0048568 A1* | 3/2004 | Soliman ................ G01S 5/0205 |
| | | 455/13.1 |
| 2005/0031344 A1* | 2/2005 | Sato .......................... B60R 1/12 |
| | | 398/42 |

(Continued)

FOREIGN PATENT DOCUMENTS

| | | | |
|---|---|---|---|
| CN | 106095565 A | 11/2016 | |
| EP | 1482751 A2 * | 12/2004 | ............. G08G 1/005 |
| KR | 20090002363 A | 1/2009 | |

*Primary Examiner* — Kenny S Lin
(74) *Attorney, Agent, or Firm* — Maschoff Brennan

(57) ABSTRACT

A mobile wireless device includes a wireless communication component, a mobility component configured to adjust a spatial placement of the mobile wireless device, a navigation circuit coupled to the mobility component, and an image sensor communicatively coupled to the wireless communication component. The navigation circuit is configured to control the mobility component to cause movement of the mobile wireless device through the space. The wireless communication component is to transmit image data via a wireless network as the mobile wireless device moves through the space.

20 Claims, 3 Drawing Sheets

Mobile Wireless Repeater

(56) References Cited

U.S. PATENT DOCUMENTS

| | | | |
|---|---|---|---|
| 2005/0148334 A1* | 7/2005 | Peeters | H04B 7/15507 |
| | | | 455/436 |
| 2005/0256963 A1 | 11/2005 | Proctor et al. | |
| 2007/0060048 A1 | 3/2007 | Kang et al. | |
| 2007/0061041 A1 | 3/2007 | Zweig | |
| 2008/0159133 A1 | 7/2008 | Yeung et al. | |
| 2008/0212491 A1 | 9/2008 | Gabara | |
| 2009/0087029 A1* | 4/2009 | Coleman | G06K 9/00208 |
| | | | 382/103 |
| 2011/0218014 A1 | 9/2011 | Abu-Qahouq | |
| 2013/0147429 A1 | 6/2013 | Kirby et al. | |
| 2013/0288600 A1 | 10/2013 | Kuulilinna et al. | |
| 2014/0075189 A1 | 3/2014 | Abraham et al. | |
| 2014/0207281 A1* | 7/2014 | Angle | H04L 12/282 |
| | | | 700/257 |
| 2014/0277854 A1* | 9/2014 | Jones | B64C 39/024 |
| | | | 701/1 |
| 2014/0304086 A1 | 10/2014 | Dasdan et al. | |
| 2016/0260049 A1* | 9/2016 | High | G06Q 30/0631 |
| 2017/0047782 A1 | 2/2017 | Shevde et al. | |
| 2017/0140349 A1 | 5/2017 | Ricci | |
| 2017/0214702 A1 | 7/2017 | Moscovici et al. | |
| 2017/0353961 A1 | 12/2017 | He et al. | |
| 2017/0366249 A1* | 12/2017 | Van Oost | H04W 52/0206 |
| 2018/0329617 A1 | 11/2018 | Jones et al. | |

\* cited by examiner

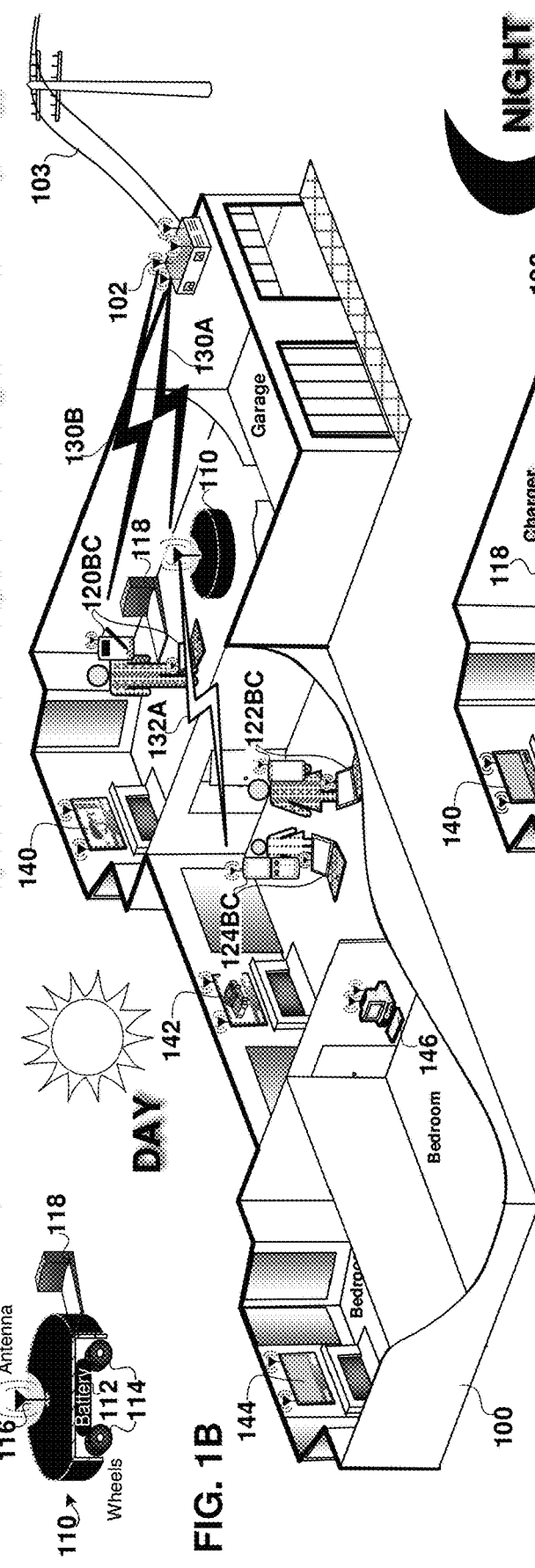
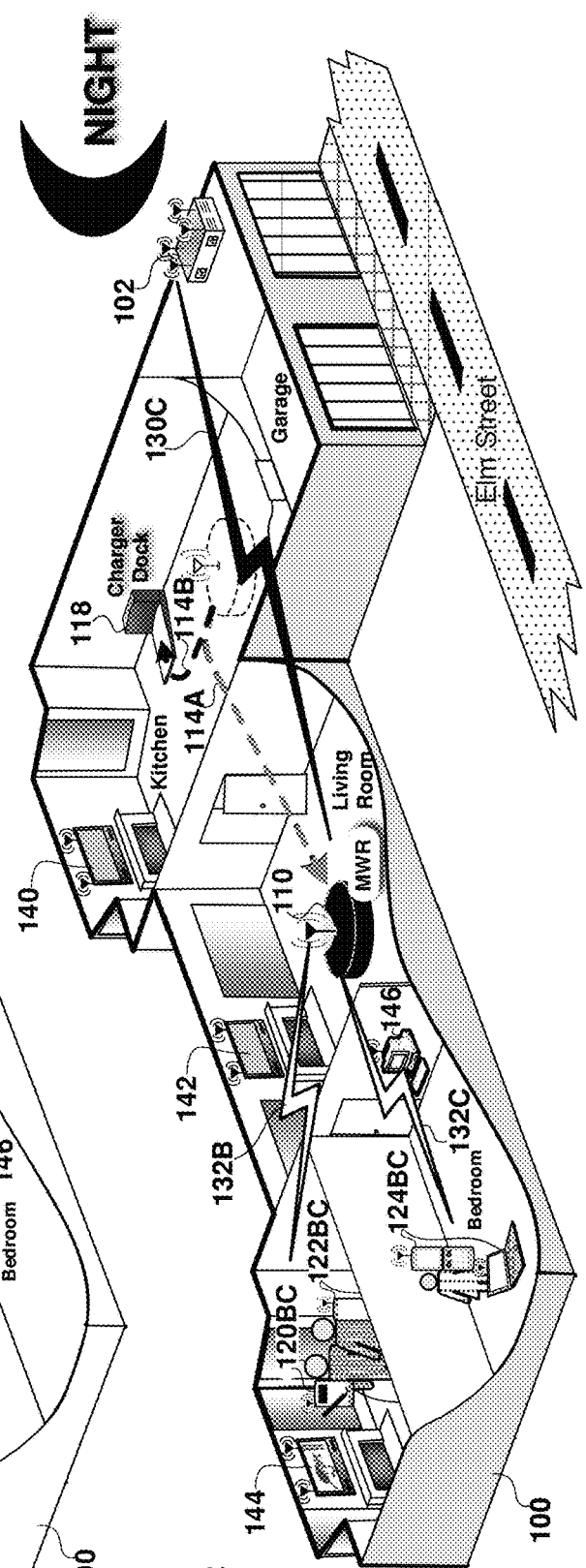

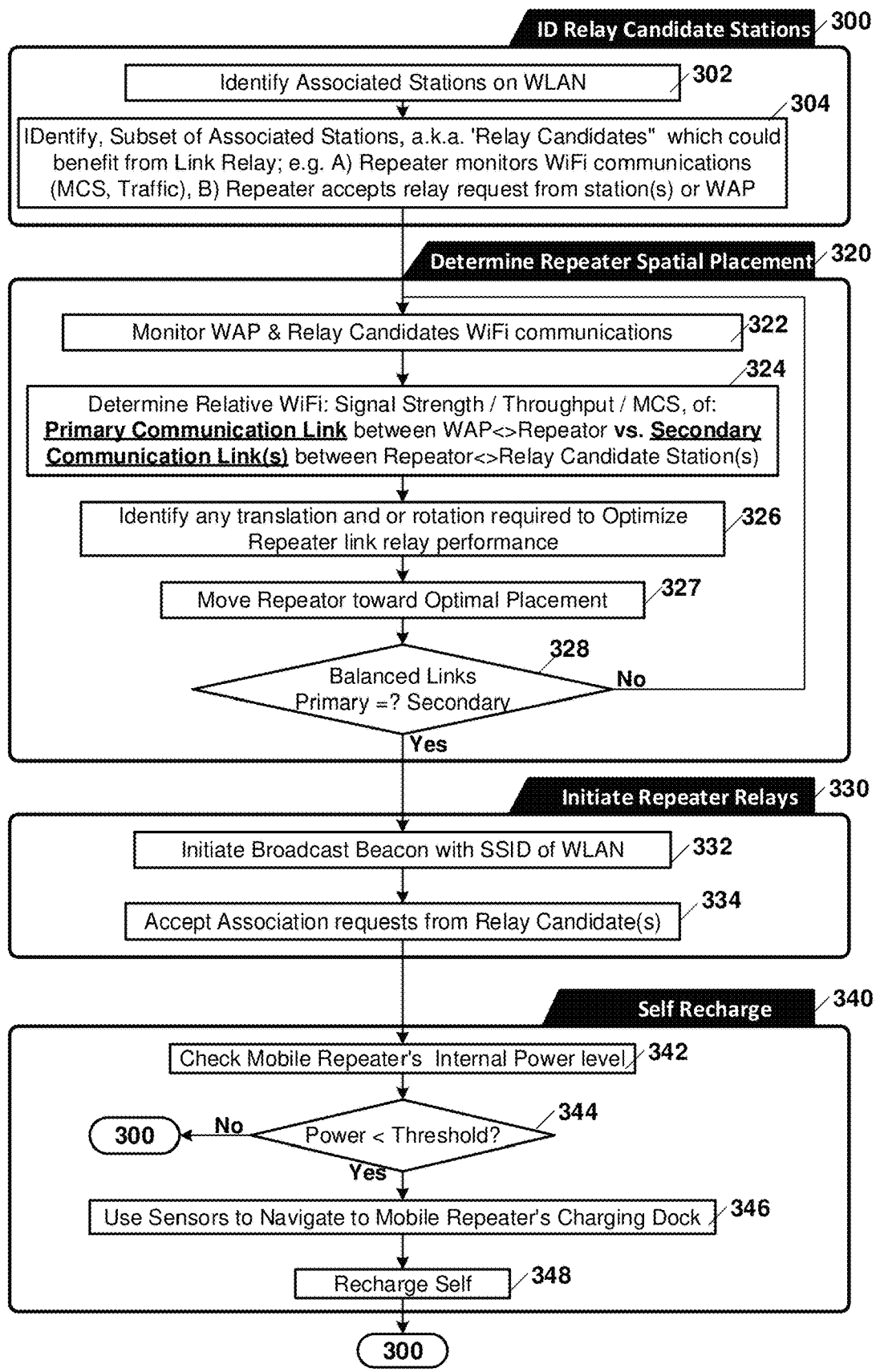
FIG. 3  Method for Operating a Mobile Wireless Repeater

MOBILE WIRELESS REPEATER

CROSS-REFERENCE TO RELATED APPLICATIONS

This application is a continuation of U.S. patent application Ser. No. 15/635,179, filed Jun. 27, 2017, titled MOBILE WIRELESS REPEATER, which is incorporated herein by reference in its entirety.

BACKGROUND

1. Field

The field of the present invention relates in general to wireless local area networks including wireless access points (WAP) and wireless stations.

2. Description of the Related Art

Home and office networks, a.k.a. wireless local area networks (WLAN) are established using a device called a Wireless Access Point (WAP). The WAP may include a router. The WAP wirelessly couples all the devices of the home network, e.g. wireless stations such as: computers, printers, televisions, digital video (DVD) players, security cameras, smoke detectors, door locks, temperature controls, etc. to one another and to the Cable or Subscriber Line through which Internet, video, and television is delivered to the home. Most WAPs implement the IEEE 802.11 standard which is a contention based standard for handling communications among multiple competing devices for a shared wireless communication medium on a selected one of a plurality of communication channels. The frequency range of each communication channel is specified in the corresponding one of the IEEE 802.11 protocols being implemented, e.g. "a", "b", "g", "n", "ac", "ad", "ax". Communications follow a hub and spoke model with a WAP at the hub and the spokes corresponding to the wireless links to each 'client' device.

After selection of a single communication channel for the associated home network, access to the shared communication channel relies on a multiple access methodology identified as Collision Sense Multiple Access (CSMA). CSMA is a distributed random-access methodology for sharing a single communication medium, by having a contending communication link back off and retry access a prospective collision on the wireless medium is detected, i.e. if the wireless medium is in use.

Communications on the single communication medium are identified as "simplex" meaning, one communication stream from a single source node to one or more target nodes at one time, with all remaining nodes capable of "listening" to the subject transmission. Starting with the IEEE 802.11ac standard and specifically 'Wave 2' thereof, discrete communications to more than one target node at the same time may take place using what is called Multi-User (MU) multiple-input multiple-output (MIMO) capability of the WAP. MU capabilities were added to the standard to enable the WAP to communicate with multiple single antenna single stream devices concurrently, thereby increasing the time available for discrete MIMO video links to wireless HDTVs, computers tablets and other high throughput wireless devices the communication capabilities of which rival those of the WAP.

Starting with the IEEE 802.11ax standard two or more of the associated stations can uplink concurrently to the WAP using either the same set of orthogonal frequency division multiplexed (OFDM) tones, a.k.a. MU-MIMO uplink, or distinct sets of OFDM tones, a.k.a. an orthogonal frequency division multiplexed access (OFDMA) uplink.

What is needed are improved methods for operating each WAP and its associated stations.

SUMMARY

A mobile wireless device includes a wireless communication component, a mobility component configured to adjust a spatial placement of the mobile wireless device, a navigation circuit coupled to the mobility component, and an image sensor communicatively coupled to the wireless communication component. The navigation circuit is configured to control the mobility component to cause movement of the mobile wireless device through the space. The wireless communication component is to transmit image data via a wireless network as the mobile wireless device moves through the space.

The invention may be implemented in hardware, firmware or software.

Associated methods are also claimed.

BRIEF DESCRIPTION OF THE DRAWINGS

These and other features and advantages of the present invention will become more apparent to those skilled in the art from the following detailed description in conjunction with the appended drawings in which:

FIGS. 1A-C are respectively; a cross-sectional view of the wireless repeater station and plan views of a residential wireless local area network (WLAN) including the mobile wireless repeater station, during day and nighttime;

FIG. 3 is a process flow diagram of processes associated with operating the mobile wireless repeater station.

DETAILED DESCRIPTION OF THE EMBODIMENTS

Figure 2:
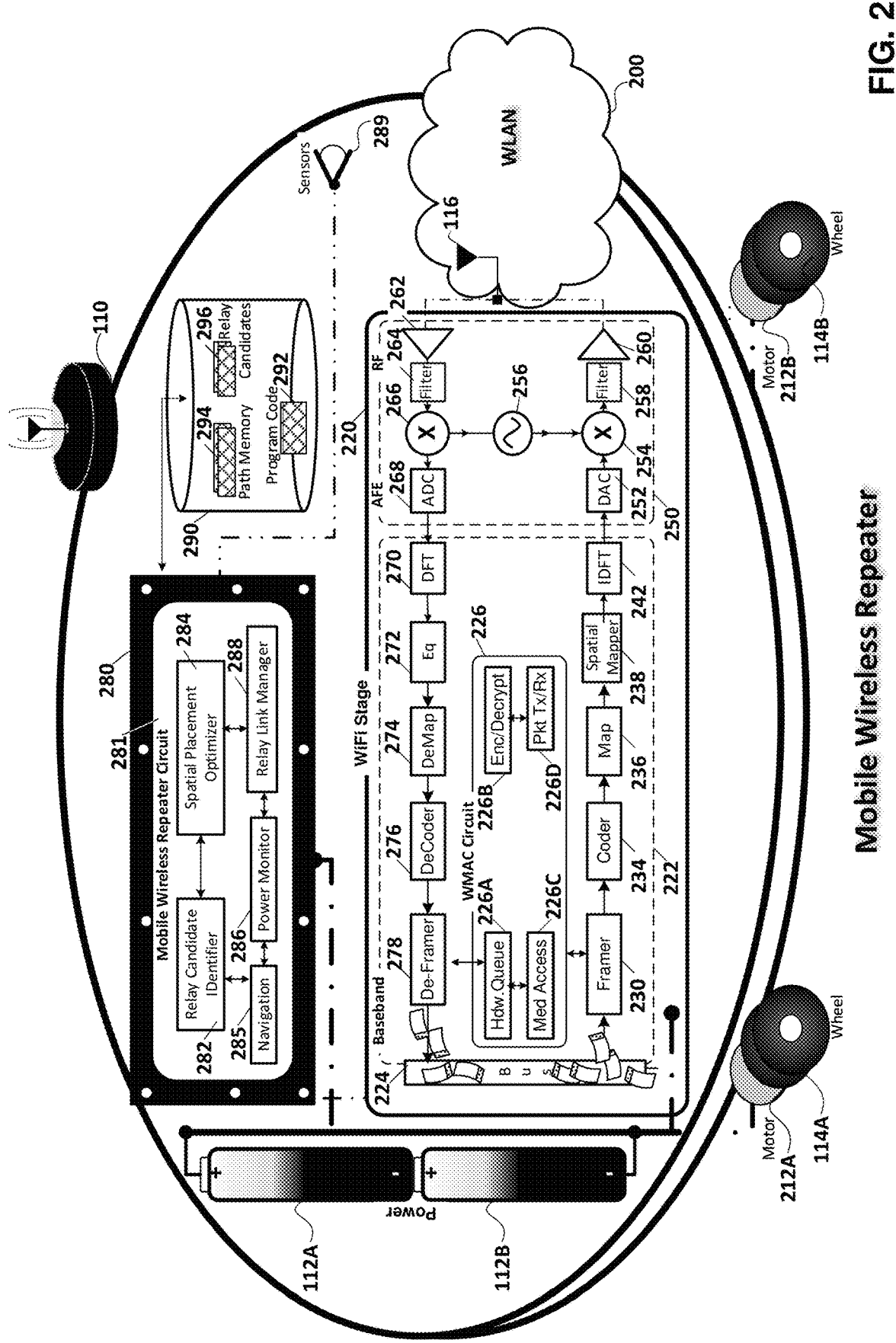
FIG. 2 is a detailed hardware block diagram of the mobile wireless repeater station.

FIGS. 1A-C are respectively; a cross-sectional view of the wireless repeater station and plan views of a residential wireless local area network (WLAN) including the Mobile Wireless Repeater Station (MWRS), during day and nighttime.

In FIG. 1A a cross-sectional view of the MWRS 110 is shown. The MWRS includes: a battery 112, motorized wheels 114, and one or more WiFi antenna 116. The MWRS 110 changes its location throughout the day to stay in the 'center' of the active WLAN stations and more particularly those stations, a.k.a. 'relay candidates' which may be experiencing difficulty communicating directly with the WAP, and to serve as a relay for those stations' communications with the WAP. The MWRS returns on an as needed basis to its charging dock 118 to charge up its battery, before returning to service as a WiFi relay, bridge, or repeater.

FIGS. 1B-C are plan views of a residential wireless local area network (WLAN) which includes the MWRS 110 at different times of the day. The WLAN in home 100 is provided by WAP 102 to its associated fixed and mobile stations. The WAP provides these stations access to the Internet via a Telco digital subscriber line (DSL) 103. The associated fixed wireless stations include: TV stations 140, 142, 144 in the kitchen, living room, and master bedroom respectively and a wireless desktop computer 146 in the child's bedroom. The mobile wireless stations include the MWRS, cellphones and notebook computers. Mom owns two portable wireless stations: i.e. her cellphone 122B and her notebook computer 122C. Dad owns two portable wireless stations: i.e. his cellphone 120B and his notebook computer 120C. Their daughter has two personal portable wireless stations: i.e. her cellphone 124B and her notebook computer 124C. The family members tend to keep these portable devices with them as they move throughout the home. The MWRS 110 changes its location throughout the day to stay in the 'center of mass' of the active WLAN stations and more particularly those stations, a.k.a. 'relay candidates' which may be experiencing difficulty communicating directly with the WAP, and to serve as a relay for those stations' communications with the WAP.

FIG. 1B shows WLAN topology and distribution of family members during the daytime on a typical Saturday afternoon with most of the active WLAN stations located in the kitchen and living room close to the WAP 102. The fixed wireless TV station 144 and the wireless desktop computer 146 in the bedrooms are not active at this time of day. Dad is shown in the kitchen watching his favorite football team on TV 140, intermittently keeping up with his fantasy football team on notebook computer 120C and video chatting with his buddies on mobile phone 120B. Mom and Sis are shown in the living room watching their favorite soccer team on TV 142, intermittently keeping up with their favorite players personal websites on notebook computers 122C and 124C and video chatting with their friends on their mobile phones 122B and 124B. The mobile wireless repeater in FIG. 1B is shown in the kitchen midway between the garage where the WAP 102 is located and the living room where fixed wireless TV 142 and the mobile stations 124BC and 122BC belonging to Sis and Mom respectively are located. The MWRS 110 changes its location throughout the day to stay in the 'center' of the active WLAN stations and more particularly those stations, a.k.a. 'relay candidates' which may be experiencing difficulty communicating directly with the WAP, and to serve as a relay for those stations' communications with the WAP. MWRS 110 has a charging dock 118 plugged into a wall outlet (not shown) in the kitchen for recharging its integral power source, e.g. battery 112. The mobile wireless repeater 110 automatically returns to its charging dock on an as needed basis. In an embodiment of the invention the return of the mobile wireless repeater 110 to its charging dock is accomplished by its homing in on an infrared beacon (not shown) emitted by charging dock 118. The wireless repeater has identified Mom's and Sis's mobile devices as having poor communication links with the WAP, and has taken over the task of serving as a relay, bridge or repeater for those communications with the WAP. The wireless repeater is shown relaying the communications between the WAP and Sis's cellphone 124B and notebook computer 124C over links 130A,132A. Dad has a direct link for his cellphone 120B and notebook computer 120C with the WAP 102 over communication link 130B.

FIG. 10 shows WLAN topology and distribution of family members on a typical Saturday night with most of the active WLAN stations located in the bedrooms far from the WAP 102 in the garage. The fixed wireless TV stations 140-142 in the kitchen and living room are not active at this time of day. Dad and Mom are shown in the master bedroom watching their favorite movie on wireless TV 144, and intermittently using their cell phones 120B, 122B for participating in the chat groups they enjoy. Sis is shown in her bedroom watching her favorite singer song-writer on notebook computer 124C, and intermittently keeping up with her classmates via chat on her cell phone 124B. In response to this shift in WLAN topology the mobile wireless repeater has changed its position from the kitchen to the living room along path 114A. Before making the transition, the mobile wireless station may return along path 114B to the charger dock 118 to replenish its internal power source, e.g. battery 112. The mobile wireless repeater is shown in the living room 112 between the garage where the WAP 102 is located and the bedrooms where fixed wireless TV 144 and the mobile stations 120BC, 122BC and 124BC belonging to Dad, Mon, and Sis respectively are located. The wireless repeater has identified Dad's, Mom's and Sis's mobile devices as having poor communication links with the WAP, and has taken over the task of serving as a relay, bridge or repeater for those devices to communicate with the WAP. The wireless repeater is shown relaying the communications between the WAP and Sis's cellphone 124B and notebook computer 124C over links 130C, 132C. The wireless repeater is shown relaying the communications between the WAP and Mom's and Dad's cellphones 120B, 122B over links 130C, 132B.

NAVIGATION: The MWRS 110 moves toward the target station 104 along a path 116 which avoids obstacles and increases the RSSI of the communications from the target station as monitored by the MWRS. In another embodiment of the invention auxiliary sensors, e.g. Light Detection and Ranging (Lidar) sensor, image sensor, mechanical bumper sensor, infrared (IR) sensor, GPS sensor, etc. may be used to complement the WiFi based navigation of the MWRS toward its optimal placement between the WAP and the relay candidate(s) or on its return path to its charging dock. In another embodiment of the invention the relay candidate station(s) and MWRS may utilize their WiFi capabilities to directly communicate with one another to assist in the navigation. In another embodiment of the invention the path metrics for paths 114A-B may be entered by the homeowner into the MWRS via an online application. When ground based MWRS 110 has reached a position between the relay candidate stations and the WAP it initiates the relay of the corresponding wireless communications.

When the MWRS 110 detects that the energy level of its internal power component, e.g. battery, capacitor, etc., falls below a threshold level it returns to its charger dock 118. In an embodiment of the invention the return navigation is made by the mobile wireless repeater tracking an infrared (IR) homing beacon emitted by the charger dock. In an embodiment of the invention where the charger dock itself has WiFi capability, the return is made by the mobile wireless repeater tracking the RSSI or power of the charger dock to move to the docking position at which the RSSI is maximized. The charger dock may have wired or wireless interface for recharging the mobile wireless repeater. Once the mobile repeater is recharged it is ready to resume its role as a wireless relay for WLAN communications between the WAP and those stations which do not have a good communication link directly with the WAP, a.k.a. the 'relay candidates'.

In an embodiment of the invention the wireless repeater station operates as a household robot, not only to perform the wireless charging described herein, but also additional household tasks without departing from the scope of the claimed invention. In another embodiment of the invention the MWRS operates also as a mobile wireless recharger, with the capability of wirelessly recharging any stations in the home that have a wireless recharging capability.

In an embodiment of the invention the WLAN operates as a MESH network with more than one WAP communicating with its subset of the associated stations and with the MWRS relaying communications between a relay candidate and the corresponding one of the WAPs, without departing from the scope of the claimed invention.

FIG. 2 is a detailed hardware block diagram of the Mobile Wireless Repeater Station 110 in accordance with an embodiment of the invention. The ground based MWRS includes: a WiFi stage 220 which couples the MWRS to the WLAN; an integral power component 112A-B which energizes all components and circuits of the MWRS; a mobility component, e.g. motor and wheel sets 212A & 114A, 212B & 114B which move the MWRS throughout the home or business; optional sensors 289 for proximity and obstacle detection; a very large scale integrated (VLSI) processor 280 for instantiating a mobile wireless repeater circuit for controlling the operation of the MWRS; and non-volatile memory or storage 290 for storing the program code 292 executed by the processor. In another embodiment of the MWRS can include multiple WiFi radios to enable full duplex relay between the WAP and the relay candidate(s). In another embodiment of the invention the relay candidate and the MWRS can use alternate wireless communication protocols, including but not limited to: Bluetooth, Zigbee, Thread, etc.

The mobile wireless repeater circuit 281 in an embodiment of the invention is instantiated by the VLSI processor 280 executing of program code 292 stored on memory 290. The mobile wireless charging circuit includes: a relay candidate identification circuit 282 for identifying which stations, a.k.a. 'relay candidates' on the WLAN are experiencing wireless communication constraints such as low throughput, low Modulation and Coding Schema (MCS) or high Packet Error Rate (PER); a spatial placement optimizer circuit 284 for optimizing the location of the MWRS for relaying communications between the WAP and the relay candidates; a navigation circuit 285 to control movement of the MWRS to the optimal locations throughout the day for relaying communications of the relay candidates, and to the charging dock for self recharging as needed; a power monitor circuit 286 for determining when the MWRS needs to recharge itself at its charger dock, and a relay link manager circuit 288 for managing the relay of communications between the WAP and the relay candidates.

WiFi: The WiFi stage 220 includes a plurality of shared and discrete components which make up the transmit and receive chains coupled to antenna 116. In an embodiment of the invention the WiFi stage may include a MIMO array of antenna each with corresponding transmit and receive paths. The WiFi stage includes a baseband circuit 222 and analog front end (AFE) and radio frequency (RF) circuit 250 and the antenna 116. The WiFi stage provides wireless communications for the MWRS on the WLAN 200 in home 100.

WiFi TRANSMISSION: The transmit chain baseband portion 222 includes the following discrete and shared components. Data to be transmitted on the packet based bus 224 is initially processed by the WiFi medium access control (WMAC) component 226. The WMAC includes: hardware queues 226A for each received and transmitted communication stream; encryption and decryption circuits 226B for encrypting and decrypting the transmitted and received communication streams; medium access circuit 226C for making the clear channel assessment (CCA), exponential random backoff and re-transmission decisions; and a packet processor circuit 226D for packet processing of the communication streams. Each sounding or data packet for wireless transmission on the transmit path components to the WAP is framed in the framer 230. Next the transmit stream is encoded and scrambled in the encoder and scrambler 234 followed by interleaving and mapping in the interleaver mapper 236. Next the transmission is spatially mapped in the spatial mapper 238. The spatially mapped stream(s) from the spatial mapper are input to Inverse Discrete Fourier Transform (IDFT) component 242 for conversion from the frequency to the time domain and subsequent transmission in the AFE and RF stage 250.

The IDFT is coupled to a corresponding one of the transmit chain components in the AFE/RF stage 250. Specifically, the IDFT couples to the digital-to-analog converters (DAC) 252 for converting the digital transmission to analog, upconverters 254, coupled to a common voltage controlled oscillator (VCO) 256 for upconverting the transmission to the appropriate center frequency of the selected channel(s), filter 258, e.g. bandpass filter, for controlling the bandwidth of the transmission, and power amplifier 260 coupled to antenna(s) 124.

WiFi RECEPTION: The receive chain includes the following discrete and shared components. Received communications on the MWRS's WiFi antenna 124 are subject to RF processing including downconversion in the AFE-RF stage 250. The receive chain includes the following discrete and shared components: low noise amplifier (LNA) 262 for amplifying the received signal under control of an analog gain control (AGC) (not shown) for setting the amount by which the received signal is amplified; filter 264 for bandpass filtering the received signals; downconverter 266 coupled to the VCO 256 for downconverting the received signals; analog-to-digital converter (ADC) 268 for digitizing the downconverted signals. The digital output from each ADC is passed to the baseband stage 222 and specifically the discrete Fourier transform (DFT) component 270 for conversion from the time to the frequency domain. The equalizer 272 accepts input from the DFT and mitigates channel impairments thereon converting the received communication on the chain into a distinct communication stream at the output. Next the demapper deinterleaver 274 converts the received symbol to bits which are deinterleaved. The decoder 276 decodes the received communication, and the de-framer 278 deframes it. The received communication is then passed to the WMAC component 226 where it is decrypted with the decryption circuit 226B and placed in the appropriate receive hardware queue 226A for transfer to the packet based bus 224.

The WiFi stage 220 is coupled to the mobile wireless repeater circuit 281 to enable the relay candidate identification circuit 282 to determine which if any of the associated stations on the WLAN are experiencing communication constraints in their communications directly with the WAP and could thus benefit from a relay of those communications via the WMRS instead. Communication constraints such as low throughput, low Modulation and Coding Schema (MCS) or high Packet Error Rate (PER), can be determined either directly by the MWRS sniffing the communications between each station with the WAP or by direct communication with the WAP or stations themselves. In another embodiment of the invention, the relay candidate identification circuit bases its selection on information received from the WAP. In another embodiment of the invention the relay candidate identification circuit 282 retains a history of the communication constraints at different times of day for each of the relay candidates and correlates this information into candidate records 296 which is also stored in memory 290. In another embodiment of the invention, this history information ca be obtained from the WAP or a cloud server.

The WiFi stage 220 is also coupled to the relay location optimization circuit 284 for optimizing the spatial placement, e.g. location and or orientation, of the MWRS for relaying communications between the WAP and the relay candidates. In an embodiment of the invention this optimization involves the determination of relative WiFi signal strength, or throughput or MCS of the primary communication link between the WAP and the MWRS versus one or more secondary links between the MWRS and a relay candidate station and the identification of any translation and or rotation of the MWRS required to optimize the MWRS's link relay performance. Movement of the MWRS to the optimal spatial placement may be accomplished: in a single step or incrementally; with movement, sniffing and evaluation of link performance evaluated at each step. Movement of the MWRS to the optimal spatial placement may be complemented with user input as to acceptable locations within the home or business structure from which the MWRS can select the optimum location. In another embodiment of the invention the location is optimized based on the link qualities of the WAP to Mobile relay station link and Mobile relay station to relay candidate link. In another embodiment of the invention, the location is optimized based on the amount of traffic and airtime used by each relay candidate, their current link quality and the expected link quality with the Mobile Wireless Relay Station.

The navigation circuit 285 is also coupled to the WiFi Stage to monitor the RSSI or power of received communications of the WAP and relay candidate stations and move the MWRS in a direction which maximizes the relayed communications therebetween. In an embodiment of the invention the navigation circuit 285 includes the capability of deriving path metrics to each of identified stations as well as the charging dock in memory 290 and of storing these metrics in path memory tables 294 in memory 290. In another embodiment of the invention the navigation circuit includes obstacle detection and avoidance capabilities provided by the WiFi stage, and or the sensors.

The optional sensors 289 may complement the existing WiFi based navigational capabilities of the MWRS, in which instance they are coupled to the navigation circuit 285. Optional sensors may include: Light Detection and Ranging (LIDAR), Charge Coupled Device (CCD), mechanical bumper, Infrared (IR), Global Positioning System (GPS), etc.

The relay link manager 288 also couples to the WiFi stage to handle the relay of communications between the WAP and each relay candidate station. Once the MWRS has arrived at an optimal spatial placement it initiates a broadcast beacon with the Service Set Identifier (SSID) of the WLAN, and accepts association requests from the relay candidates, and relays subsequent communications between each relay candidate and the WAP.

The integral power component in an embodiment of the invention, comprises batteries 112A-B which energize all components and circuits of the MWRS via electrical connections thereto. This power component is rechargeable and is recharged as needed by autonomous return of the MWRS to the recharging dock under control of the navigation circuit 285. The determination of when self-recharging of the MWRS is required is determined by the power monitor circuit 286 which is coupled to the power component.

Mobility of the ground based MWRS is provided by the mobility component, e.g. motor and wheel pairs 212A & 114A and 212B &114B. Energy is supplied to the motors from the power component, with each motors rotation, e.g. rate and direction, controlled by the navigation circuit 285.

FIG. 3 is a process flow diagram of processes associated with operating the mobile wireless repeater station. Processing begins with the block 300 of processes involved in the identification of relay candidate stations. In process 302 the MWRS identifies associated stations on the WLAN. This process involves the sniffing of WLAN communications between each station and the WAP to determine the MAC address and capabilities of each station as well as the load and performance of each corresponding communication link. Capabilities determination is made during a capabilities exchange between the WAP and each station, such as that which is part of the IEEE 802.11 standard. In another embodiment of the invention the WAP passes the MAC address, capabilities, load and performance of each associated station directly to the MWRS. In still another embodiment of the invention the MWRS communicates directly with each station to determine this information. Next in process 304 the subset of associated stations, a.k.a. 'relay candidates' which are experiencing communication constraints e.g. low throughput, low MCS, or high PER are identified from the information accumulated in the prior step either via sniffing of WLAN communications or by direct communication of the information from the WAP or stations. Control is then passed to the block 320 of processes associated with determining the optimal spatial placement of the MWRS for relaying communications between the WAP and the relay candidate(s).

The block 320 of processes associated with determining the optimal spatial placement of the MWRS for relaying communications between the WAP and the relay candidate(s) begins with process 322 in which WAP and relay candidates WiFi communication links are monitored by the MWRS for signal strength, throughput and or MCS. In process 324 one or more of the throughput, MCS, airtime, packet error rate (PER) and signal strength parameters are determined for the primary communication link between the WAP and the MWRS versus the secondary communication link(s) between the MWRS and the relay candidate station(s). Next in process 326 any translation and or rotation of the MWCS required to optimize the MWRS's link relay performance is determined. In an embodiment of the invention the determination of spatial placement involves moving in a direction in which the relative signal strength, throughput and or MCS of the primary and secondary communication relay links are balanced. In process 327 the mobility component, e.g. motorized wheels, on the MWRS are under control of the navigation circuit 285 (See FIG. 2) used to move the MWRS to the required location. Next in decision process 328 a determination is made as to whether the primary and secondary relay communication links are in balance as to at least one of: signal strength, throughput, or MCS. If not then control returns to process 322 for another iteration of the special placement optimization process. Alternately, if the primary and secondary relay communication links are balanced then control passes to the next block of processes in which relay links are established.

The block 330 of processes associated with initiating and managing relay of communication links between the WAP and the relay candidate stations begins with process 332. In process 332, the arrival of the MWRS at an optimal spatial placement initiates the transmission by the MWRS of a broadcast beacon with the Service Set Identifier (SSID) of the WLAN. Next in process 334 the MWRS accepts association requests from the relay candidates, and relays subsequent communications between each relay candidate and the WAP. Control is then passed to the block 340 of processes involved in recharging the MWRS.

The self recharging block 340 of processes assures that MWRS itself maintains the charge of its integrated power component, e.g. battery or capacitor at a level sufficient to perform its relay of communication links for the relay candidate stations. In process 342 the MWRS checks its own internal power level to determine whether the internal power level of the MWRS has fallen below a threshold level. If it has not then in decision process 344 control is returned to the block 300 of processes associated with re-evaluating and re-identifying the relay candidate stations. These processes are repeated throughout the day to respond to changes in the topology of the WLAN, and to determine the latest subset of relay candidate stations. Alternately, if a determination is made in decision process 344 that the MWRS needs recharging itself, e.g. that its internal power level has fallen below a threshold amount, then control is passed to process 346. In process 346 sensors are used to navigate the MWRS to its charging dock. In an embodiment of the invention an IR sensor on the MWRS may be used to track an IR beacon emitted by the charging dock. In another embodiment of the invention the charging dock may be a station itself and the MWRS uses the RSSI or power of the received communications from the charging dock to aid its return navigation. Next in process 348 the MWRS navigates to the charging dock. Next control is passed to process 348 in which the MWRS is recharged, after which process control returns to process 300.

The components and processes disclosed herein may be implemented in a combination of software, circuits, hardware, firmware, processor executing program code stored in non-volatile memory as integrated with the WAP's existing transmit and receive path components, and without departing from the scope of the Claimed Invention.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A mobile wireless device comprising:
   a wireless communication component configured to operate as a wireless repeater within a wireless network that includes a wireless access point;
   a power component configured to supply power to a motor;
   a mobility component coupled to the motor, the mobility component to adjust a spatial placement of the mobile wireless device, wherein a rotation of the motor causes the mobility component to adjust the spatial placement the mobile wireless device in a space;
   a navigation circuit coupled to the motor, the navigation circuit configured to control the rotation of the motor for movement of the mobile wireless device through the space;
   a relay candidate identifier circuit configured to receive a communication from the wireless access point identifying one or more relay candidates experiencing one or more communication constraints when the one or more relay candidates are communicating with the wireless access point;
   a spatial placement circuit configured to determine a variable spatial location between the identified one or more relay candidates and the wireless access point that, if the mobile wireless device is moved to the variable spatial location, causes the wireless communication component to improve the communication constraints, the variable spatial location based on first properties of a first communication link between the mobile wireless device and the wireless access point and second properties of a second communication link between the mobile wireless device and the identified one or more relay candidates;
   a relay link manager configured to, after the mobile wireless device arrives at the variable spatial location, initiate an association with the one or more relay candidates; and
   an image sensor communicatively coupled to the wireless communication component, the wireless communication component being configured to transmit image data via a wireless network as the mobile wireless device moves through the space.

2. The mobile wireless device of claim 1 further comprising at least one obstacle detection sensor coupled to the navigation circuit, the at least one obstacle detection sensor to provide obstacle data to the navigation circuit.

3. The mobile wireless device of claim 2, wherein the navigation circuit is configured to generate an obstacle avoidance instruction to adjust a movement path of the mobile wireless device through the space based on the obstacle data from the at least one obstacle detection sensor.

4. The mobile wireless device of claim 1, wherein the navigation circuit uses data captured by the image sensor to navigate the mobile wireless device in the space.

5. The mobile wireless device of claim 1, wherein the navigation circuit uses data captured by at least one sensor to navigate the mobile wireless device in the space, the at least one sensor including: a Light Detection and Ranging (LIDAR) sensor, a mechanical bumper, an infrared (IR) sensor, or a Global Positioning System (GPS) device.

6. The mobile wireless device of claim 1, wherein the navigation circuit is configured to control an autonomous return of the mobile wireless device to a dock.

7. The mobile wireless device of claim 6, wherein the navigation circuit is configured to use a signal strength of a communication received from the dock to aid in the return of the mobile wireless device to the dock.

8. The mobile wireless device of claim 6, wherein the navigation circuit is configured to cause the mobile wireless device to return to the dock responsive to a determination that a power condition of the mobile wireless device is met.

9. The mobile wireless device of claim 1, wherein the navigation circuit is configured to start a navigation of the mobile wireless device in the space responsive to a condition being satisfied.

10. The mobile wireless device of claim 1, wherein the navigation circuit is configured to control navigation of the mobile wireless device in the space based on a predetermined navigation path.

11. The mobile wireless device of claim 10, wherein the predetermined navigation path is determined based on user input.

12. The mobile wireless device of claim 1, wherein the wireless communication component is configured to stream video data via the wireless network.

13. The mobile wireless device of claim 12, wherein the streamed video data is captured by the image sensor.

14. The mobile wireless device of claim 1, wherein the relay link manager is further configured to:
    after arriving at the variable spatial location, initiate a broadcast beacon with a service set identifier (SSID) of the wireless access point;

after initiating the broadcast beacon, receive an association request from the one or more relay candidates;
accept the association request; and
relay subsequent communications between each of the one or more relay candidates and the wireless access point.

15. A mobile wireless device comprising:
a wireless communication component configured to operate as a wireless repeater in a wireless network that includes a wireless access point;
a mobility component configured to adjust a spatial placement of the mobile wireless device, wherein a rotation of the mobility component is to cause an adjustment to the spatial placement of the mobile wireless device in a space;
a navigation circuit coupled to the mobility component, the navigation circuit configured to control the mobility component to cause movement of the mobile wireless device through the space;
a relay candidate identifier circuit configured to sniff communications between the wireless access point and devices communicating in the wireless network with the wireless access point to identify one or more relay candidates experiencing one or more communication constraints when the one or more relay candidates are communicating with the wireless access point;
a spatial placement circuit configured to determine a variable spatial location within the space between the identified one or more relay candidates and the wireless access point that, if the mobile wireless device is moved to the variable spatial location, causes the wireless communication component to improve the communication constraints, the variable spatial location based on first properties of a first communication link between the mobile wireless device and the wireless access point and second properties of a second communication link between the mobile wireless device and the identified one or more relay candidates;
a relay link manager configured to, after the mobile wireless device arrives at the variable spatial location, initiate an association with the one or more relay candidates; and
an image sensor communicatively coupled to the wireless communication component, the wireless communication component being configured to transmit image data via a wireless network as the mobile wireless device moves through the space.

16. The mobile wireless device of claim 15 further comprising at least one obstacle detection sensor coupled to the navigation circuit, the at least one obstacle detection sensor to provide obstacle data to the navigation circuit.

17. The mobile wireless device of claim 16, wherein the navigation circuit is configured to generate an obstacle avoidance instruction to adjust a movement path of the mobile wireless device through the space based on the obstacle data from the at least one obstacle detection sensor.

18. The mobile wireless device of claim 15, wherein the navigation circuit uses data captured by the image sensor to navigate the mobile wireless device in the space.

19. The mobile wireless device of claim 15, wherein the navigation circuit is configured to start a navigation of the mobile wireless device in the space responsive to a condition being satisfied.

20. The mobile wireless device of claim 15, wherein the wireless communication component is configured to stream video data via the wireless network.

* * * * *